(12) United States Patent
Morehead

(10) Patent No.: US 8,033,562 B2
(45) Date of Patent: Oct. 11, 2011

(54) VEHICLE TOW HITCH WITH COUPLING GUIDE

(76) Inventor: Greg Morehead, Plattsmouth, NE (US)

( * ) Notice: Subject to any disclaimer, the term of this patent is extended or adjusted under 35 U.S.C. 154(b) by 203 days.

(21) Appl. No.: 12/424,199

(22) Filed: Apr. 15, 2009

(65) Prior Publication Data

US 2010/0264626 A1   Oct. 21, 2010

(51) Int. Cl.
*B60D 1/36* (2006.01)
(52) U.S. Cl. ........................................ 280/477
(58) Field of Classification Search .................. 280/477, 280/491.3, 508
See application file for complete search history.

(56) References Cited

U.S. PATENT DOCUMENTS

| | | | |
|---|---|---|---|
| 2,944,836 A * | 7/1960 | Matthews | 280/491.3 |
| 4,657,275 A | 4/1987 | Carroll | |
| 4,708,359 A | 11/1987 | Davenport | |
| 4,903,978 A | 2/1990 | Schrumm, III | |
| 5,080,386 A | 1/1992 | Lazar | |
| 5,503,422 A | 4/1996 | Austin | |
| 5,758,893 A | 6/1998 | Schultz | |
| 5,909,892 A | 6/1999 | Richardson | |
| 6,698,783 B1 * | 3/2004 | Zechbauer | 280/477 |
| 2002/0145268 A1 * | 10/2002 | Zechbauer | 280/477 |

* cited by examiner

*Primary Examiner* — Anne Marie Boehler
*Assistant Examiner* — Daniel Yeagley
(74) *Attorney, Agent, or Firm* — Gerald M. Keller

(57) ABSTRACT

A trailer hitch guide device may include a guide ramp, a guide ramp release, a hitch guide base, and a bottom metal layer. The trailer hitch guide device may enable a person to couple a trailer and a towing vehicle with ease.

2 Claims, 8 Drawing Sheets

VEHICLE TOW HITCH WITH COUPLING GUIDE

TECHNICAL FIELD

The present invention generally relates to the field of towing devices, and more particularly to a tow hitch with a guide for guiding and coupling a trailer coupler.

BACKGROUND

A trailer may include an unpowered vehicle, which may be adapted to be pulled or towed by a powered vehicle. A trailer hitch may include a tow ball and coupler configuration, a tow pin and jaw configuration, or a pintle hitch. A trailer hitch with a tow ball and coupler configuration may include a tow ball attached to the chassis of a vehicle. One advantage of a tow ball and coupler configuration may include allowing a trailer to swivel and/or articulate.

SUMMARY

The present disclosure is directed to a towing and/or a trailer hitch with a guide ramp configured for guiding a trailer coupler and/or trailer tongue onto a ball hitch.

A trailer hitch guide device may include a guide ramp, a guide ramp release, a hitch guide base, and a bottom metal layer. The trailer hitch guide device may enable a person to couple a trailer and a towing vehicle with ease.

In one embodiment, a trailer tongue may be guided on a guide ramp toward a guide ramp release. Generally, the guide ramp may guide the trailer tongue over the ball for coupling. While the trailer tongue may be guided over the ball, the trailer tongue may push against a guide ramp release and cause the guide ramp release to pivot about a bolt. As the guide ramp release pivots about the bolt, at least one release arm may simultaneously push and/or force an extension peg, which may be connected and/or welded to a hitch guide extension, away from hitch guide base and from a first set of base slots and may push against tension caused by a spring assembly. The hitch guide extension may pivot about a bolt and drop below the trailer tongue and the hitch guide base while the trailer tongue becomes coupled to the ball. The guide ramp may be folded under the hitch guide base by continuing to pivot about the bolt and may be locked by securing the extension peg into a base slot.

It is to be understood that both the foregoing general description and the following detailed description are exemplary and explanatory only and are not restrictive of the invention claimed. The accompanying drawings, which are incorporated in and constitute a part of the specification, illustrate an example of the invention and together with the general description, serve to explain the principles of the technology.

BRIEF DESCRIPTION OF THE DRAWINGS

The numerous objects and advantages of the present technology may be better understood by those skilled in the art by reference to the accompanying figures in which.

DETAILED DESCRIPTION

Figure 1:
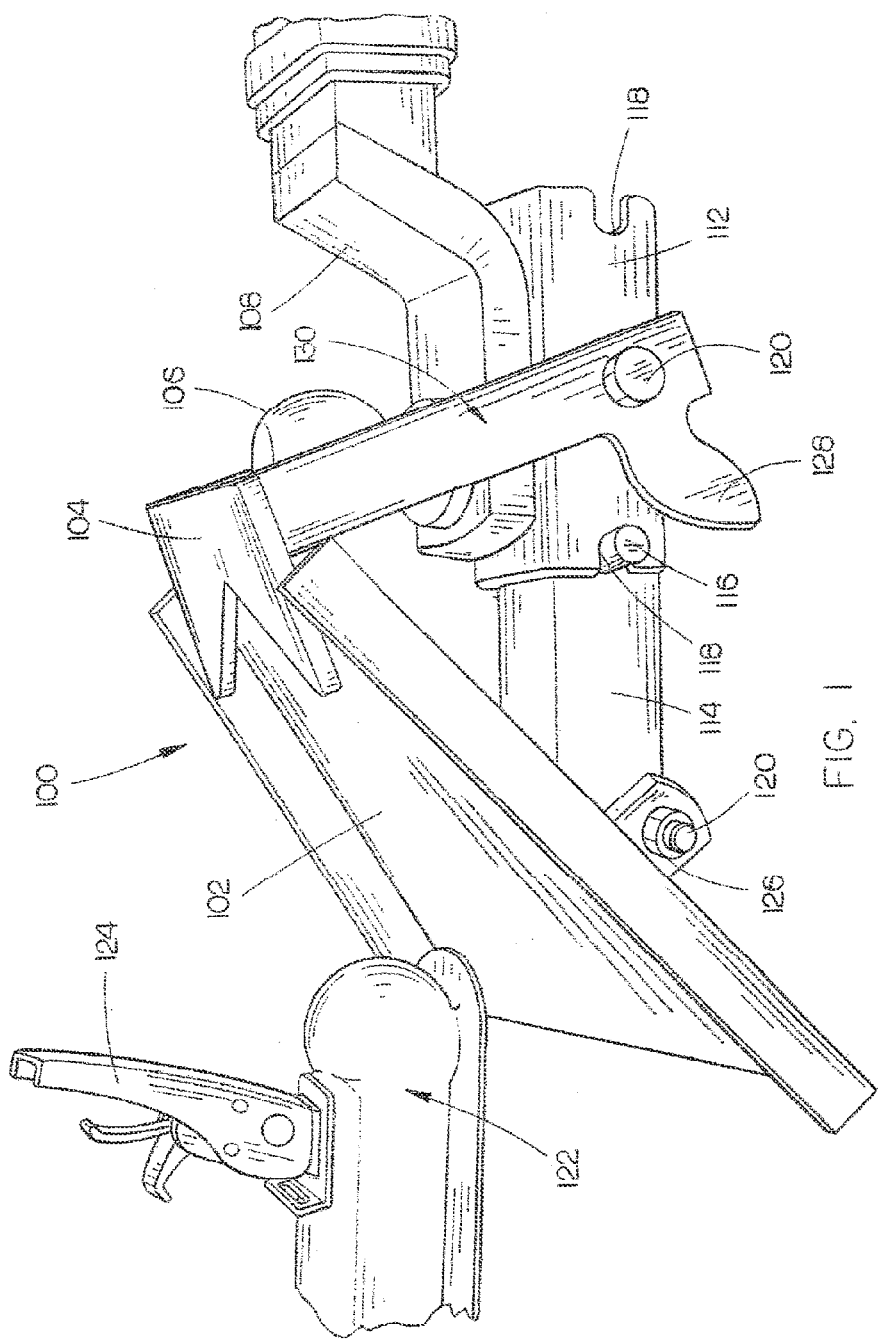
FIG. 1 is an isometric view illustrating a self-coupling trailer hitch.
Figure 2:
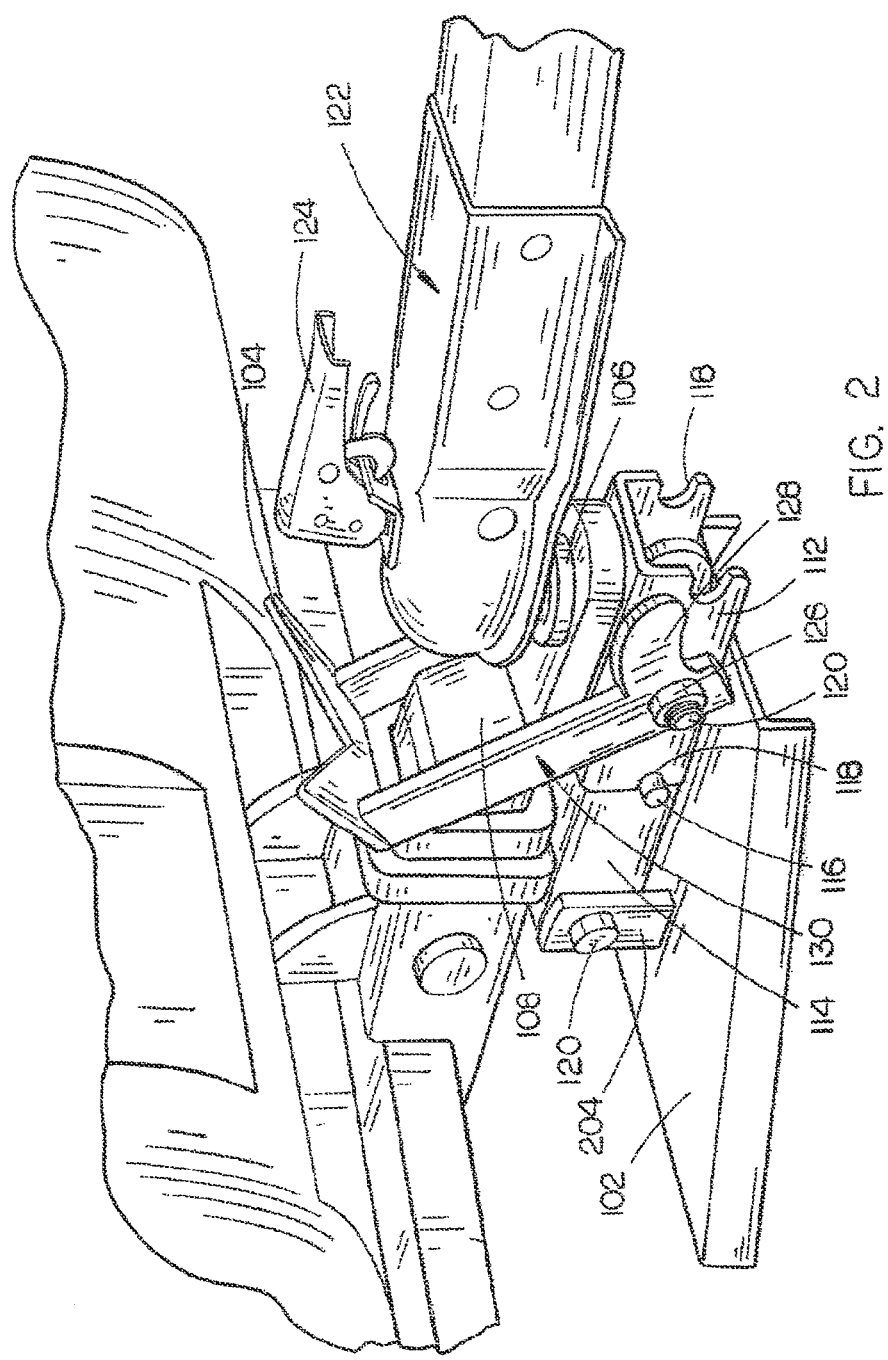
FIG. 2 is an isometric view illustrating the self-coupling trailer hitch in FIG. 1.
Figure 3:
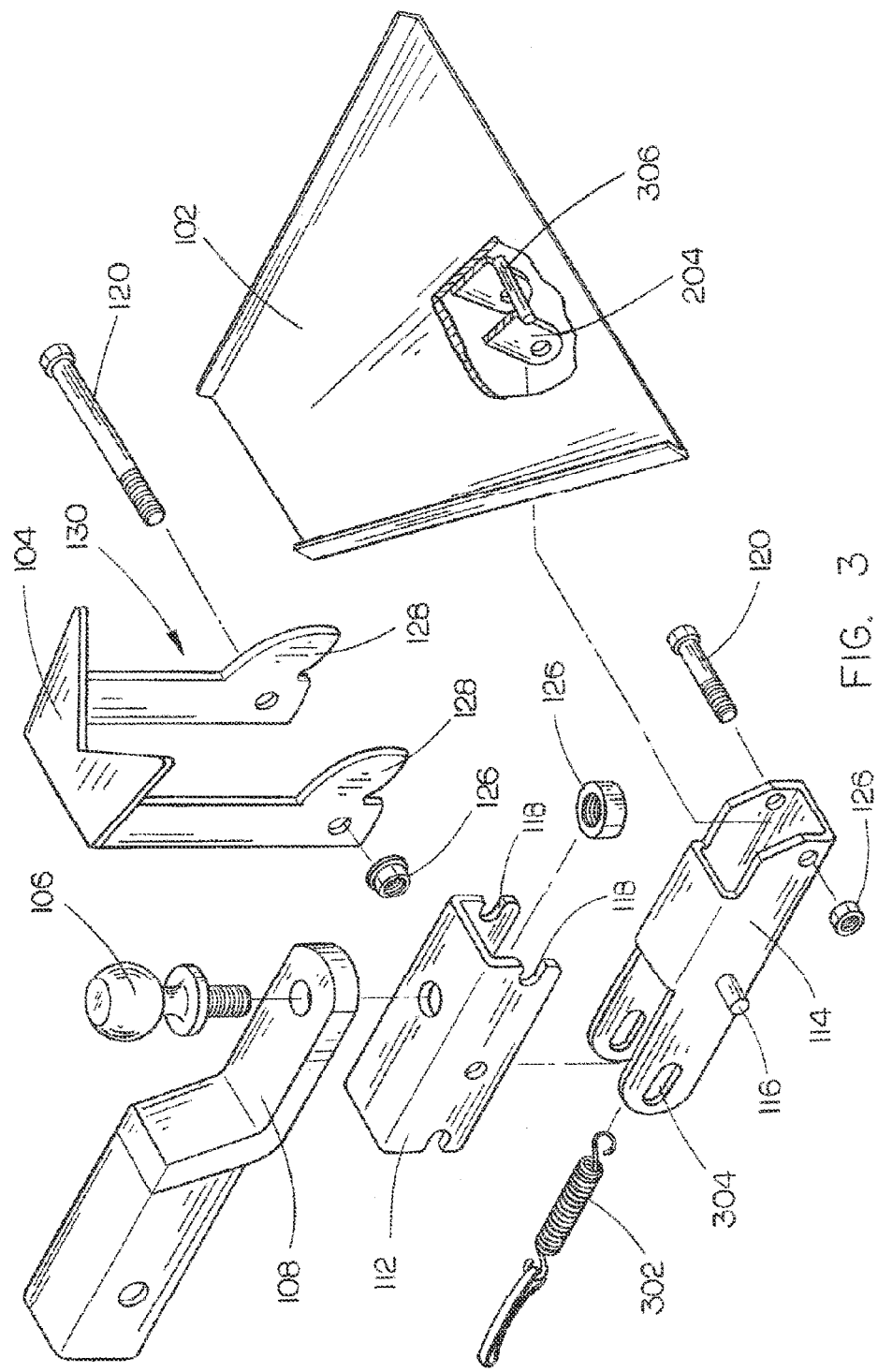
FIG. 3 is an exploded view illustrating the self-coupling trailer hitch in FIG. 1.
Figure 4:
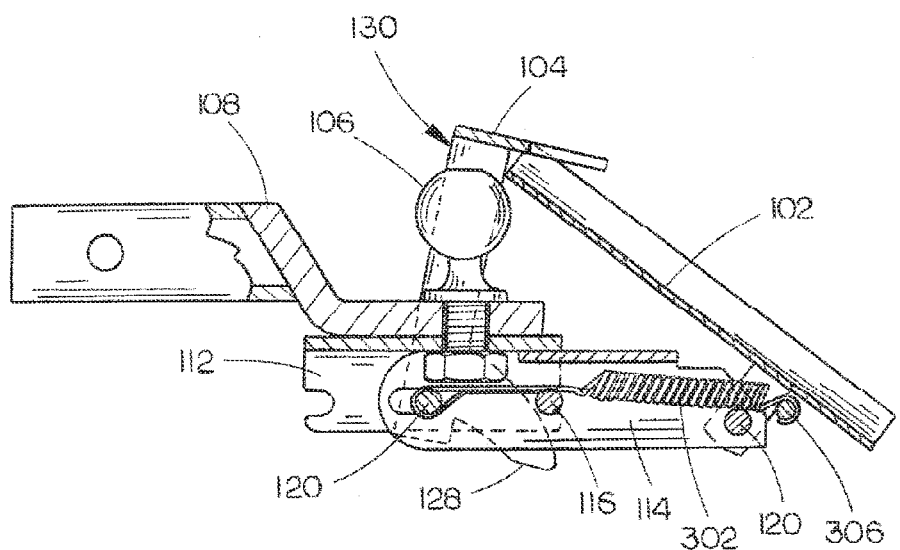
FIG. 4 is a partial cross-sectional view illustrating an exemplary self-coupling trailer hitch.
Figure 5:
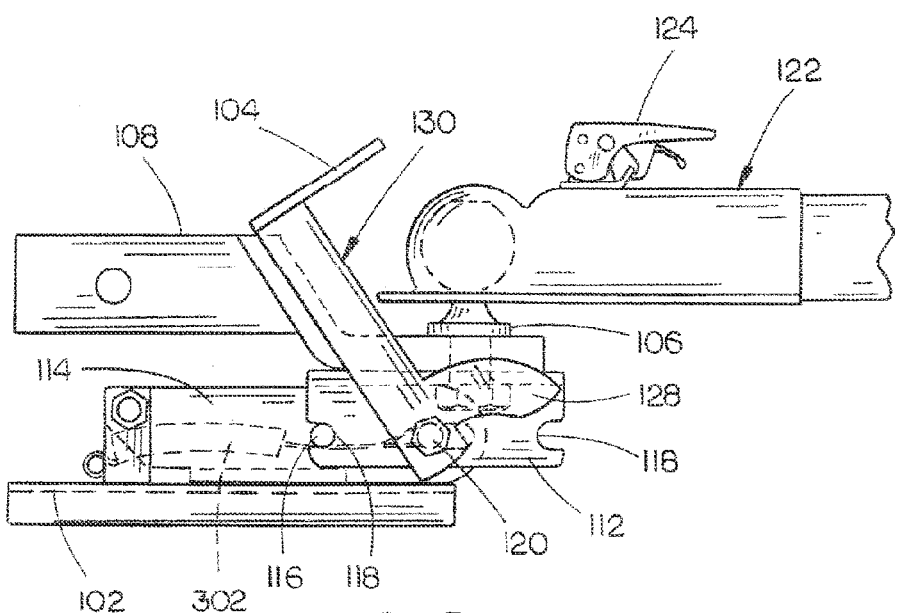
FIG. 5 is a partial cross-sectional view illustrating an exemplary self-coupling trailer hitch.

The following discussion is presented to enable a person skilled in the art to make and use the present teachings. Various modifications to the illustrated examples will be readily apparent to those skilled in the art, and the generic principles herein may be applied to other examples and applications without departing from the present teachings. Thus, the present teachings are not intended to be limited to examples shown, but are to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of the present teachings. Skilled artisans will recognize the examples provided herein have many useful alternatives and fall within the scope of the present teachings.

Reference will now be made, in detail, to embodiments of the invention. Additional details of the invention are provided in the examples illustrated in the accompanying drawings.

Referring generally to FIGS. 1 through 7, one depiction of a trailer hitch guide device 100 is illustrated. The trailer hitch guide device 100 may include a guide ramp 102, a guide ramp release 130, a hitch guide base 112, and a hitch guide extension 114. The trailer hitch guide device 100 may enable a person to couple a trailer and a towing vehicle with ease.

The trailer hitch guide device 100 may include a guide ramp 102. The guide ramp may include a flat object for directing, coupling, and/or guiding a trailer tongue 122 and/or some other coupling device to a towing vehicle. In one example, guide ramp 102 may include a flat piece of metal configured for directing a trailer tongue 122 to a guide ramp release 130. The guide ramp 102 may also be constructed of other materials, such as a polymer and/or a composite material. In one instance, guide ramp 102 may include a trapezoidal piece of metal with sides of metal configured to keep a trailer tongue 122 on a predefined pathway. In this instance, the widest portion of the guide ramp 102 may be oriented toward the trailer tongue 122 when the guide ramp 102 is in an upright and/or operable position. Additionally, the guide ramp 102 may include at least one guide ramp support arm 204 configured for coupling to a hitch guide extension 114. A guide ramp support arm 204 may include a piece of metal coupled to the guide ramp 102 in a perpendicular fashion, where the guide ramp support arm 204 may be configured to be attached to a hitch guide extension 114, such as by a bolt 120 and nut 126 configuration. The bolt 120 and nut 126 configuration(s) may allow the guide ramp 102 to pivot about the bolt 120 and nut 126 and may further allow the guide ramp 102 to be folded under a hitch guide extension 114 and hitch guide base 112. In one example, the guide ramp support arm 204 may be attached (e.g., welded) to the bottom of the guide ramp 102, or to a first side of the guide ramp 102, where the second side comes in contact with trailer tongue 122.

The trailer hitch guide device 100 may include guide ramp release 130. Guide ramp release 130 may further include tongue catch 104 and/or release arm 128. Guide ramp 102 may direct trailer tongue 122 to tongue catch 104, which may be an upper portion of guide ramp release 130. Tongue catch 104 may include a piece of metal or other material configured for hooking, catching, and/or directing trailer tongue 122 back and over ball 106. In one example, tongue catch 104 may include a substantially square piece of metal with a notch on one side, where the notch is configured to catch, engage, and/or be coupled to a trailer tongue 122 subsequent to the trailer tongue 122 being guided by guide ramp 102. When engaged with trailer tongue 122, tongue catch 104 may prevent from moving any direction (e.g., sideways) except toward or away from ball 106. Being engaged with tongue catch 104 may include trailer tongue 122 being in contact with and/or being locked with tongue catch 104. One example of the tongue catch 104 being engaged with trailer tongue 122 may include utilizing a spring-loaded hook. In one example, as trailer tongue 122 is being directed via guide ramp 102, trailer tongue 122 may become engaged with tongue catch 104 and may cause guide ramp release 130 to move back and/or pivot about a bolt 120. As the guide ramp release 130 is pivoted about bolt 120 and toward ball 106 and/or a towing vehicle, at least one release arm 128 may drive and/or push at least one extension peg 116 away from hitch guide base 112 and base slot 118 via at least one release arm 128. The at least one release arm 128 may include an extension (i.e., release arm 128) of guide ramp release 130 having at least a partially curved surface and/or edge. A partially curved surface may be configured to contact and push against extension peg 116 when guide ramp release 130 is pivoted about bolt 120. Some examples of an extension peg 116 may include a bolt passing through at least a portion of the hitch guide base 112 and/or hitch guide extension 114 or a pin fastened to the surface of the hitch guide extension 114. Another example of an extension peg 116 may include a flat plate and/or a catch point coupled to an edge of the hitch guide base 112 and/or the hitch guide extension 114, where the flat plate may be configured to support the hitch guide extension 114.

The trailer hitch guide device 100 may include hitch guide base 112. Hitch guide base 112 may include a base configured for supporting guide ramp release 130, being coupled to ball mount 108, and/or being coupled to hitch guide extension 114. In one instance, hitch guide base 112 may include a section of square metal tubing. In one embodiment, hitch guide base 112 may include a portion of carbon steel square tube and may be coupled to ball mount 108 by ball 106 and nut 126. Additionally, hitch guide base 112 may be configured to receive hitch guide extension 114 such that hitch guide extension 114 may fit into hitch guide base 112, one example being illustrated in FIG. 1.

The trailer hitch guide device 100 may include hitch guide extension 114. Hitch guide extension 114 may be configured to be coupled to hitch guide base 112, and may include extension peg 116 for securing the hitch guide extension 114 to hitch guide base 112 via base slot 118. Additionally, hitch guide extension 114 may be configured to fit inside or outside of hitch guide base 112. For example, hitch guide extension 114 may include square metal tubing configured to fit inside of hitch guide base 112. In a separate example, hitch guide extension 114 may include square metal tubing configured to fit outside of hitch guide base 112. Further, hitch guide extension 114 may include at least one metal strap configured to slide on both or either side of hitch guide base 112, where the at least one metal strap may include an extension peg 116 and at least one extension slot 304. In some instances, hitch guide extension 114 and/or guide ramp 102 may be completely and/or partially removable from trailer hitch guide device 100.

Additionally, hitch guide extension 114 may be configured to be coupled to guide ramp 102, for example by at least one guide ramp support arm 204 and a bolt 120 and nut 126 assembly. Further hitch guide extension 114 may be coupled to hitch guide base 112, for example, by spring assembly 302. Spring assembly 302 may function to couple hitch guide extension 114 to hitch guide base 112 and act as means for maintaining the position of hitch guide extension 114 when coupled to hitch guide base 112. Spring assembly 302 may be coupled to bolt 120 and/or spring support 306, and spring assembly 302 may provide tension on hitch guide extension 114 so that a user may be required to pull hitch guide extension 114 away from hitch guide base 112 when changing the guide ramp 102 position.

Figure 6:
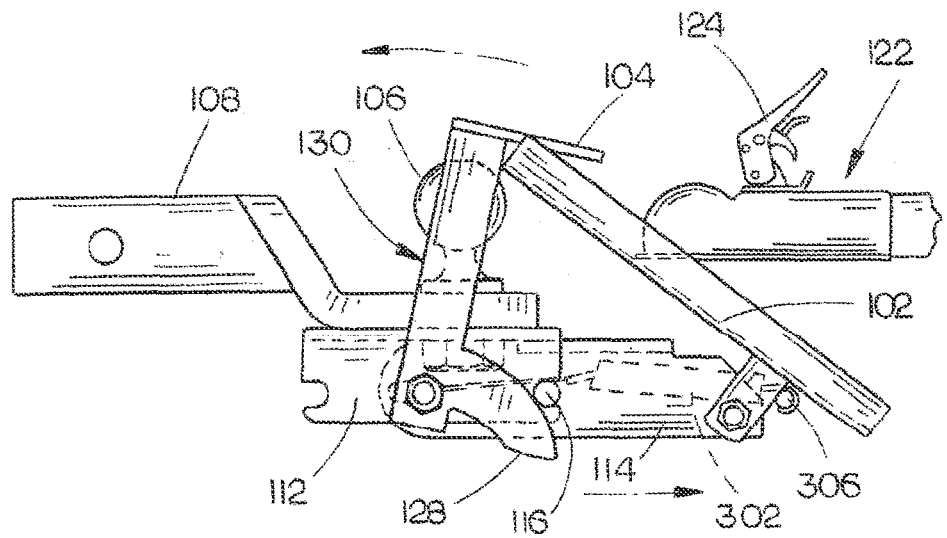
FIG. 6 is a partial cross-sectional view illustrating an exemplary self-coupling trailer hitch.
Figure 7:
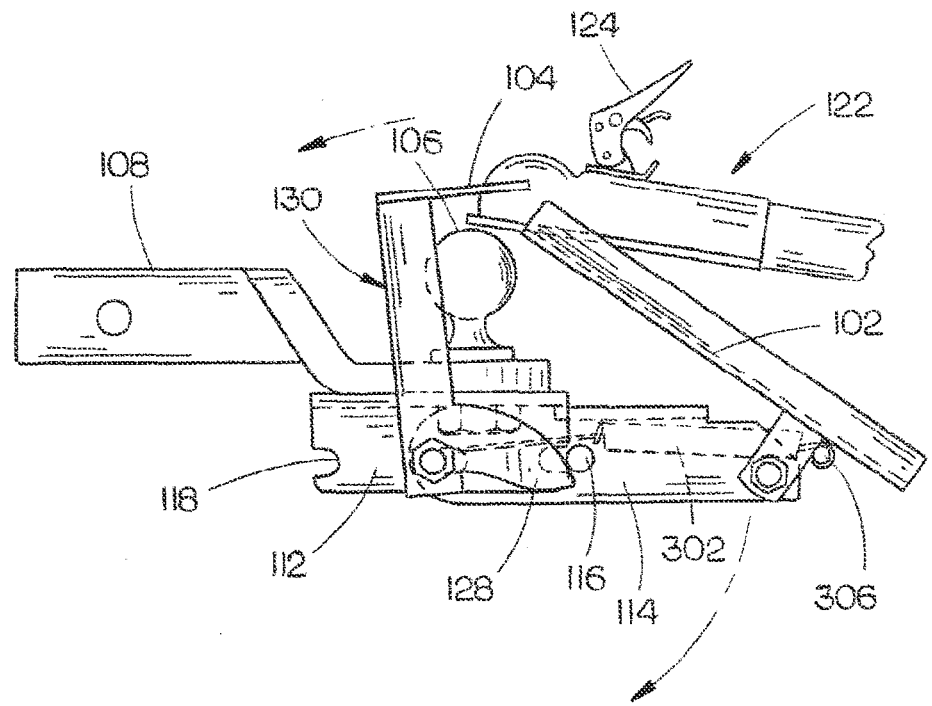
FIG. 7 is a partial cross-sectional view illustrating an exemplary self-coupling trailer hitch.

In one embodiment, and as depicted in FIGS. 6 and 7, trailer tongue 122 may be guided on guide ramp 102 toward guide ramp release 130. As trailer tongue 122 may contact guide ramp release 130 and/or tongue catch 104, tongue catch 104 may prevent trailer tongue 122 from straying and/or wandering from a predetermined path to ball 106 and may continue to guide trailer tongue 122 over ball 106. Generally, guide ramp 102 may guide trailer tongue 122 over ball 106 and gravity may pull trailer tongue 122 over ball 106 for coupling. While trailer tongue 122 may be guided over ball 106, trailer tongue 122 may push against guide ramp release 130 and cause guide ramp release 130 to pivot about bolt 120. As guide ramp release 130 pivots about bolt 120, at least one release arm 128 may simultaneously push and/or force extension peg 116, which may be connected and/or welded to hitch guide extension 114, away from hitch guide base 112, from a first set of at least one base slot 118 and may push against a tension caused by spring assembly 302. This action may release hitch guide extension 114 from being coupled to hitch guide base 112, for example, by sliding the hitch guide extension 114 out of and away from hitch guide base 112. Subsequent to uncoupling hitch guide extension 114 from hitch guide base 112, hitch guide extension 114 may pivot about bolt 120 and drop below trailer tongue 122 and hitch guide base 112 while trailer tongue 122 becomes coupled to ball 106. Trailer tongue 122 may become coupled to ball 106 by securing tongue lever 124. Further, guide ramp 102 may be folded under hitch guide base 112 by continuing to pivot about bolt 120 and may be locked by securing at least one extension peg 116 into at least one base slot 118, where that at least one base slot 118 may be on a side of hitch guide base 112 opposite a first at least one base slot 118. Folding the guide ramp 102 under and securing it to the hitch guide base 112 may serve to keep the guide ramp 102 in a secure and low-profile position.

Figure 8:
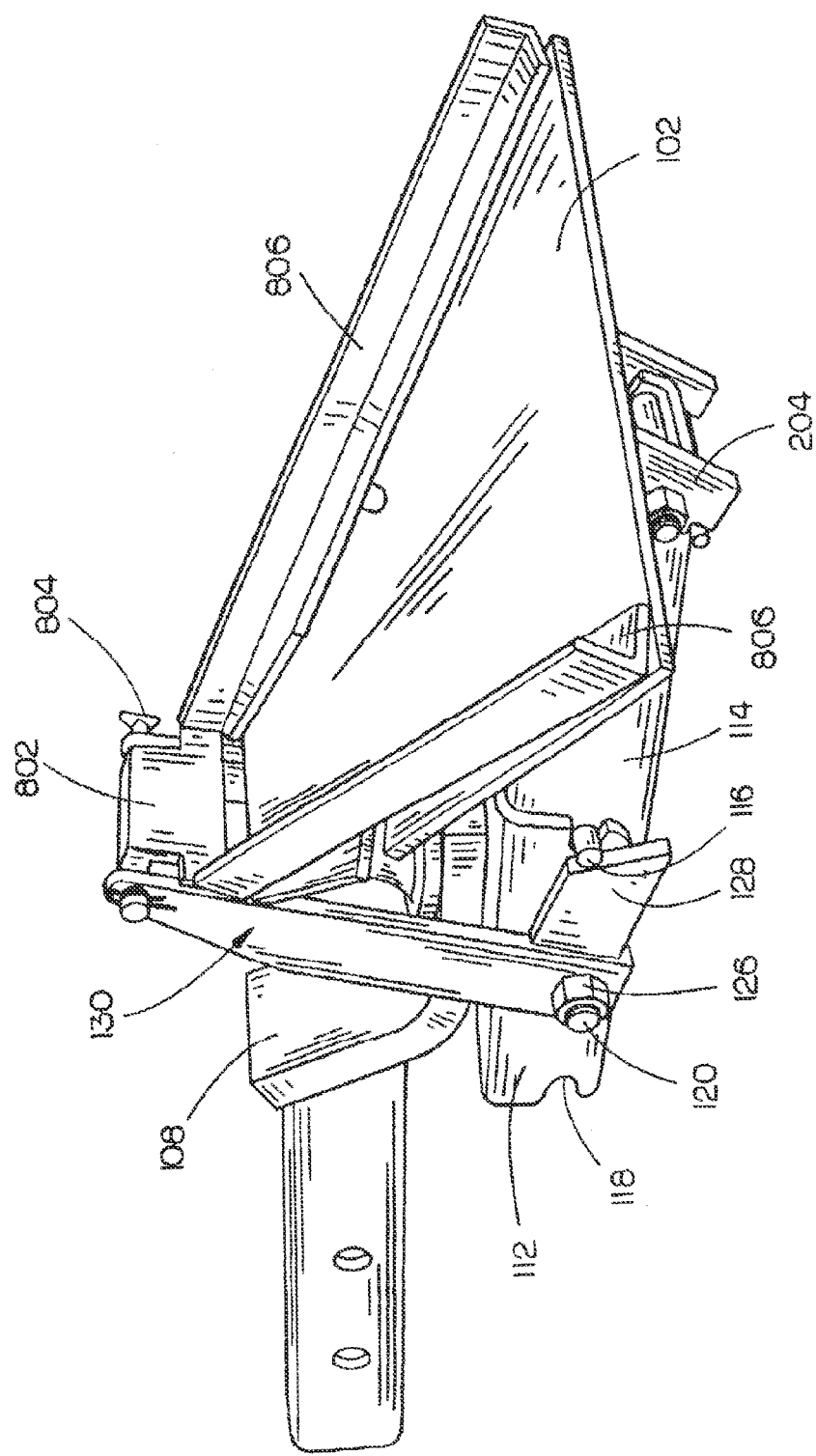
FIG. 8 is an isometric view illustrating an exemplary embodiment of the self-coupling trailer hitch.
Figure 9:
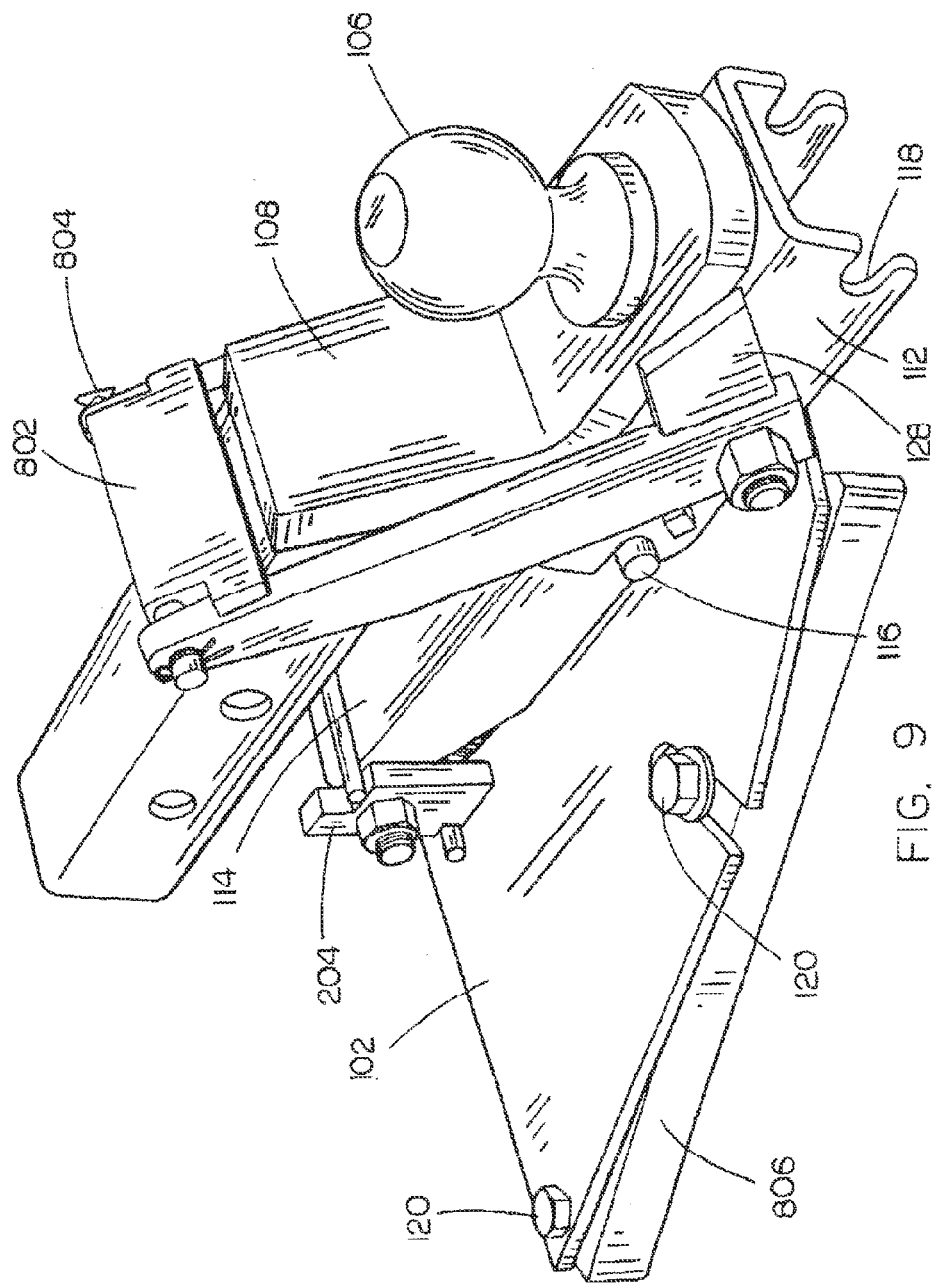
FIG. 9 is an isometric view illustrating an exemplary embodiment of the self-coupling trailer hitch.
Figure 10:
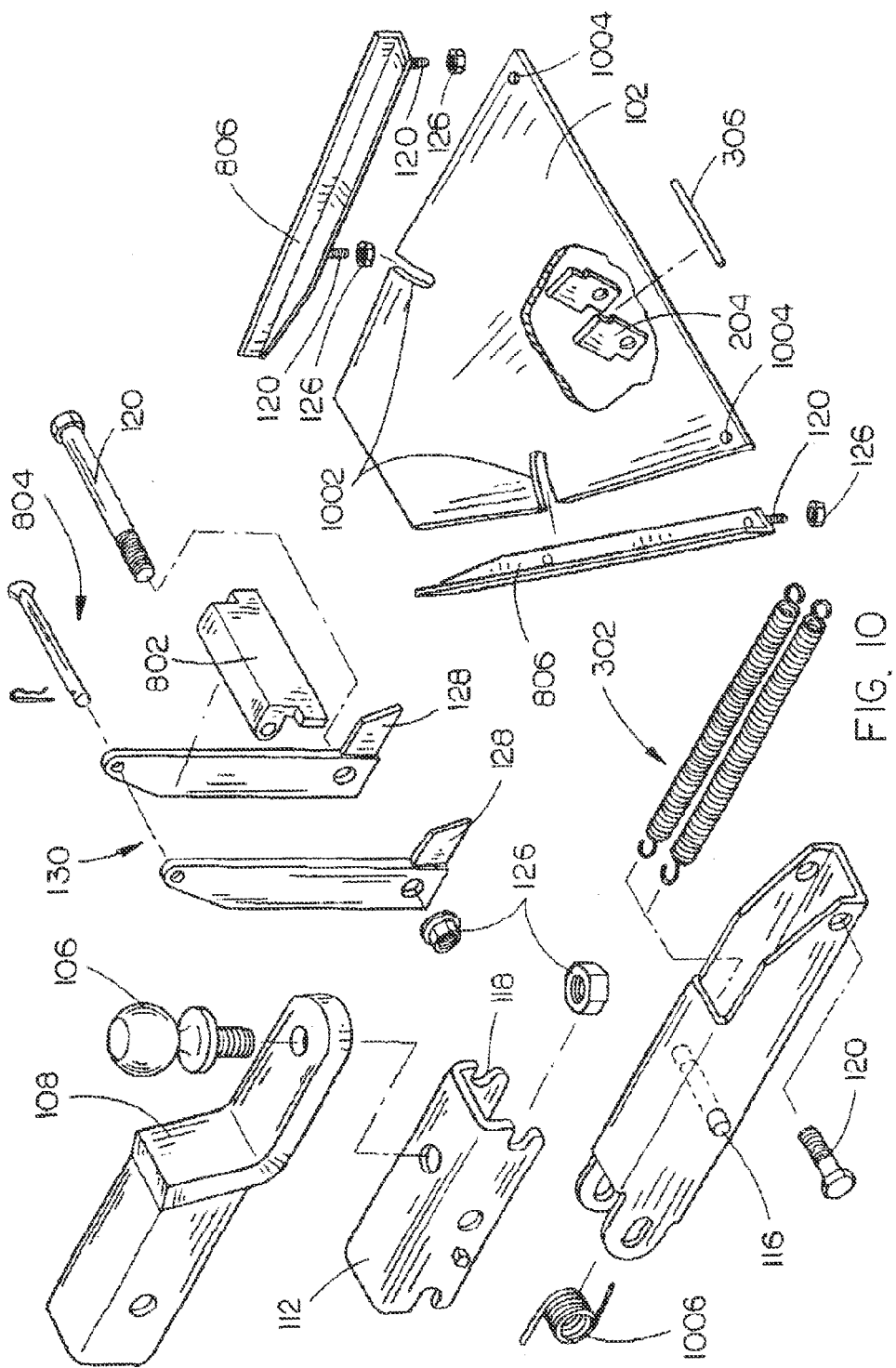
FIG. 10 is an exploded view illustrating the self-coupling trailer hitch in FIGS. 8 and 9.

FIGS. 8 through 10 generally illustrate an embodiment of trailer hitch guide device 100. In this embodiment, trailer hitch guide device 100 may include guide ramp 102 with at least one adjustable guide 806. An adjustable guide 806 may be positioned by loosening a bolt 120 and nut 126 assembly and sliding the adjustable guide 806 on the guide ramp 102 to a desired position. The adjustable guide 806 may be coupled with the guide ramp by at least one bolt 120 and nut 126 situated in at least one hole 1004 and/or adjusting slot 1002. In some instances, a rotatable tongue catch 802 may be utilized. A rotatable tongue catch 802 may be utilized to stop and/or direct trailer tongue 122 over ball 106 and may act to trigger guide ramp release 130. Further, rotatable tongue catch 802 may be rotated about pin assembly 804 and/or may be completely removed from trailer hitch guide device 100 when pin assembly 804 is removed. The trailer hitch guide device 100 is shown in FIG. 8 in a position where the guide ramp 102 is in a first exemplary position ready to guide trailer tongue 122 over ball 106. FIG. 9 illustrates a second exemplary position where the guide ramp release 130 has been triggered and guide ramp 102 has been rotated under the hitch guide extension 114. This position may be suitable for transportation purposes. Additionally, a torsion spring 1006 may be utilized for rotating the guide ramp 102 under hitch guide extension 114. The torsion spring 1006 may be configured such that when released by guide ramp release 130, the guide ramp 102 may be automatically rotated under the hitch guide extension 114 utilizing only the force from the torsion spring 1006.

The trailer hitch guide device 100 may be manufactured from a variety of materials, including carbon steel, stainless steel, aluminum, and/or a polymer.

It is believed that the present technology and many of its attendant advantages will be understood from the foregoing description, and it will be apparent that various changes may be made in the form, construction, and arrangement of the components thereof without sacrificing all of its material advantages. The form herein before described being merely explanatory embodiments thereof, it is the intention of the following claims to encompass and include such changes.

What is claimed is:

1. A self-coupling trailer hitch, comprising:
 a guide ramp configured for guiding a trailer tongue to a tongue catch;
 a guide ramp release, including the tongue catch for directing the trailer tongue over a ball, and a release arm for pushing at least one extension peg coupled to the hitch guide extension and releasing hitch guide extension;
 a hitch guide base configured for supporting the guide ramp release, where the hitch guide base is coupled to the ball and a ball mount; and
 the hitch guide extension configured for supporting the guide ramp and being operably connected to the hitch guide base, where the hitch guide extension is configured to be pivotable about the hitch guide base, the hitch guide extension includes a spring assembly coupled to the guide ramp and the hitch guide base, and where the guide ramp is pivotably coupled to the hitch guide extension.

2. A self-coupling trailer hitch, comprising:
 a guide ramp configured for guiding a trailer tongue to a tongue catch;
 a guide ramp release, including a pivotable tongue catch for directing the trailer tongue over a ball, where the pivotable tongue catch pivots about a removable pin assembly, and a release arm for pushing at least one extension peg coupled to a hitch guide extension and releasing the hitch guide extension;
 a hitch guide base configured for supporting the guide ramp release, where the hitch guide base is coupled to the ball and a ball mount;
 the hitch guide extension configured for supporting the guide ramp and being operably connected to the hitch guide base, where the hitch guide extension is configured to be pivotable about the hitch guide base, and the hitch guide extension includes a spring assembly coupled to the guide ramp and the hitch guide base, where the guide ramp is pivotably coupled to a hitch guide extension; and
 a torsion spring configured to rotate at least one of the hitch guide extension or the guide ramp.

\* \* \* \* \*